(12) United States Patent
Nakano et al.

(10) Patent No.: US 12,173,806 B2
(45) Date of Patent: Dec. 24, 2024

(54) FLOW RATE CONTROL UNIT AND WATER SUPPLY DEVICE WITH FINE BUBBLE GENERATING ARRANGEMENT INCORPORATING FLOW RATE CONTROL UNIT

(71) Applicant: TOFLE CO., INC., Osaka (JP)

(72) Inventors: Katsutoshi Nakano, Suita (JP); Kazuya Ashibe, Hagi (JP)

(73) Assignee: TOFLE CO., INC., Osaka (JP)

( * ) Notice: Subject to any disclaimer, the term of this patent is extended or adjusted under 35 U.S.C. 154(b) by 27 days.

(21) Appl. No.: 18/304,949

(22) Filed: Apr. 21, 2023

(65) Prior Publication Data

US 2023/0341057 A1 Oct. 26, 2023

(30) Foreign Application Priority Data

Apr. 26, 2022 (JP) ................. 2022-072622

(51) Int. Cl.
| | |
|---|---|
| *F16K 17/30* | (2006.01) |
| *B01F 23/237* | (2022.01) |
| *B01F 35/71* | (2022.01) |
| *B01F 35/75* | (2022.01) |
| *F16K 3/26* | (2006.01) |
| *F16K 3/34* | (2006.01) |

(52) U.S. Cl.
CPC ...... *F16K 17/30* (2013.01); *B01F 23/237611* (2022.01); *B01F 35/71805* (2022.01); *B01F 35/7547* (2022.01); *F16K 3/26* (2013.01); *F16K 3/34* (2013.01)

(58) Field of Classification Search
CPC .............. F16K 17/30; B01F 23/237611; B01F 35/71805; B05B 7/0018
See application file for complete search history.

(56) References Cited

U.S. PATENT DOCUMENTS

| | | | | |
|---|---|---|---|---|
| 2,219,408 | A  * | 10/1940 | Bens ................. | G05D 16/0641 251/48 |
| 2004/0182442 | A1* | 9/2004 | Frampton ........... | F16K 31/1226 137/460 |
| 2010/0101666 | A1* | 4/2010 | Pechtold ............. | F16K 31/1221 137/505 |
| 2013/0037132 | A1* | 2/2013 | Schmoll ................. | F16K 17/30 137/505.11 |
| 2015/0260305 | A1* | 9/2015 | Mayr ..................... | F16K 17/30 251/12 |

FOREIGN PATENT DOCUMENTS

JP 2015070935 A 4/2015

* cited by examiner

*Primary Examiner* — Atif H Chaudry
(74) *Attorney, Agent, or Firm* — Buchanan Ingersoll & Rooney PC

(57) ABSTRACT

A flow rate control unit includes (a) a housing including a hollow cylindrical wall configured to form a flow passage, an upstream wall, a downstream wall, an inlet opening, and an outlet opening; (b) a valve member disposed inside the cylindrical, configured to move between a most upstream position and a most downstream, the valve member including a pressure receiving portion that faces the inlet opening; and (c) an elastic biasing member (d) The valve member or the cylindrical wall forms a first guide passage. (e) The valve member forms a second guide flow passage.

12 Claims, 10 Drawing Sheets

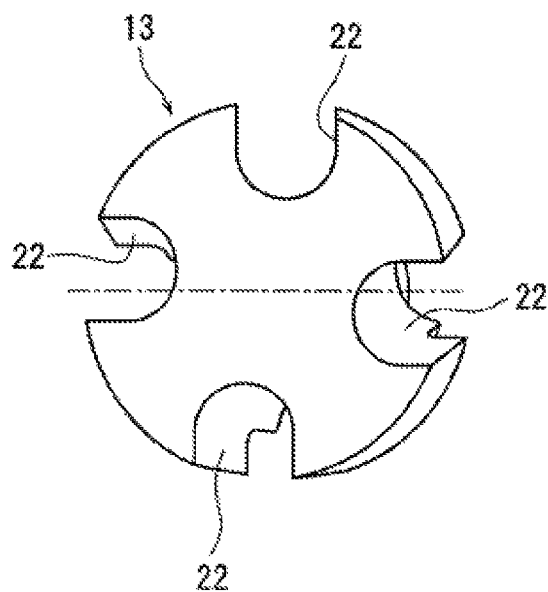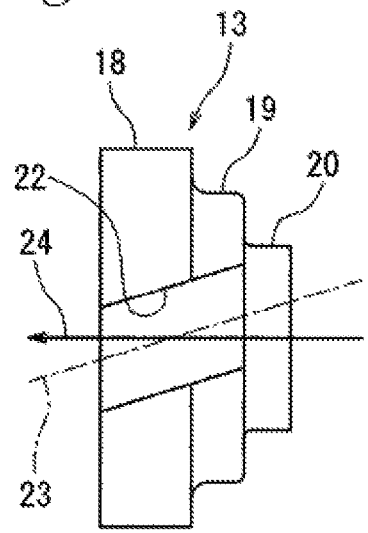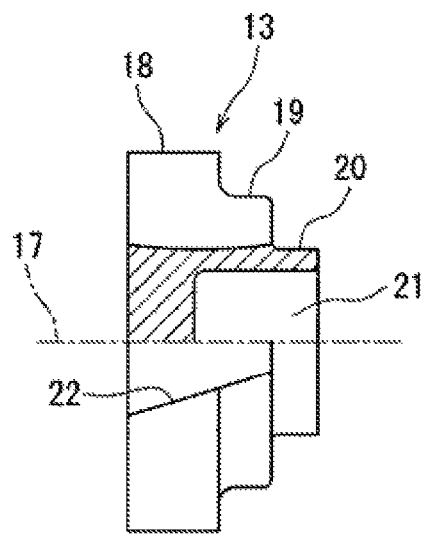

FLOW RATE CONTROL UNIT AND WATER SUPPLY DEVICE WITH FINE BUBBLE GENERATING ARRANGEMENT INCORPORATING FLOW RATE CONTROL UNIT

CROSS REFERENCE TO RELATED APPLICATION

This application claims benefit of priority to Japanese Patent Application 2022-072622, filed Apr. 26, 2022, the entire content of which is incorporated herein by reference.

TECHNICAL FIELD

The present invention relates to a flow rate control unit that regulates an amount of liquid flowing in a tube, and a water supply device with a fine bubble generating function incorporating the flow rate control unit.

BACKGROUND

Water supply devices such as shower head is expected to spray water with constant high pressure irrespective of the pressure supplied from the source. Actually, however, in tall buildings, water with sufficient pressure may not be obtained depending on places or heights.

JP 2015-070935 A discloses a shower head capable of spraying water with sufficient pressure even with smaller amount of water, by arranging air-intake and ejection ports closely in the shower head and thereby reducing waterway resistance and efficiently mixing air into the water.

The shower head disclosed is designed to maintain the pressure of the spraying water by mixing water into the water, and it is unable to spray a certain amount of water in a stable manner irrespective of the pressure of water being supplied.

SUMMARY

An object of the present invention is to provide a flow rate control unit configured to automatically spray a substantially constant amount of water regardless of a water pressure, and a water supply device with a fine bubble generating arrangement incorporating the flow rate control unit.

To achieve this object, a flow rate control unit according to a preferred embodiment of the present invention includes:
(a) a housing (10) having
a hollow cylindrical wall (12) configured to form thereinside a flow passage (15) that guides liquid from an upstream side toward a downstream side,
an upstream wall (14) disposed on the upstream side of the flow passage (15),
a downstream wall (13) disposed on the downstream side of the flow passage (15),
an inlet opening (16) formed in the upstream wall (14), and
an outlet opening (22) formed in the downstream wall (13);
(b) a valve member (25) disposed inside the hollow cylindrical wall (12) and between the upstream wall (14) and the downstream wall (13),
the valve member (25) being moveable between a most upstream position at which a movement of the valve member (25) toward the upstream side is restricted by the upstream wall (14) and a most downstream position at which a movement of the valve member (25) toward the downstream side is restricted by the downstream wall (13),
the valve member (25) having a pressure receiving portion (31) that faces the inlet opening (16) and receives a force, in a direction toward the downstream side, from the liquid flowing into the flow passage (15) from the inlet opening (16); and
(c) an elastic biasing member (35) configured to bias the valve member (25) toward the most upstream position and deform such that the movement of the valve member (25) toward the downstream side increases in response to a force received at the pressure receiving portion (31) from the liquid increases,
(d) wherein the valve member (25) or the cylindrical wall (12) forms a first guide flow passage (30) that guides the liquid flowing into the flow passage (15) from the inlet opening (16) to the downstream side of the valve member (25),
(e) wherein the valve member (25) cooperates with the downstream wall (13) to form, between the valve member (25) and the downstream wall (13), a second guide flow passage (33) that guides the liquid from the first guide flow passage (30) to the outlet opening (22),
(f) wherein the second guide flow passage (33) cooperates with the valve member (25) and the downstream wall (13) to constitute a variable resistance portion that gives a resistance to the liquid passing through the second guide flow passage (33), the resistance increasing as the valve member (25) moves from the upstream wall (14) toward the downstream side,
(g) wherein the first guide flow passage (30) extends through the valve member (25) along a central axis (11) of the flow passage (15),
(h) wherein the valve member (25) has an inner hollow cylindrical portion (29) extending from the upstream side toward the downstream side along the central axis (11) and having an opening at a downstream side end portion of the valve member (25),
(i) wherein the downstream wall (13) has an outer hollow cylindrical portion (20) extending from the downstream side toward the upstream side along the central axis (11) and having an opening at an upstream side end portion of the cylindrical portion (20),
(j) wherein an outer diameter of the inner hollow cylindrical portion (29) is smaller than an inner diameter of the outer hollow cylindrical portion (20),
(k) the inner hollow cylindrical portion (29) is insertable inside the outer hollow cylindrical portion (20) and, when inserted, leaving a gap extending inside the outer hollow cylindrical portion (20) and forming the second guide cylindrical passage (33) between the inner hollow cylindrical portion (29) and the outer hollow cylindrical portion (20), and
(l) wherein a length of the second guide flow passage (33) increases with the movement of the valve member (25) from the upstream side toward the downstream side, which in turn increases a resistance applied to the liquid passing through the second guide flow passage (33).

BRIEF DESCRIPTION OF THE DRAWINGS

FIG. 4A shows a rear view, FIG. 4B shows a side view, and FIG. 4C shows a partially cut side view, of a downstream wall constituting the flow rate control unit shown in FIG. 1;

DETAILED DESCRIPTION OF THE PREFERRED EMBODIMENTS

Hereinafter, preferred embodiments of a flow rate control unit and a water supply device incorporating the flow rate control unit according to an embodiment of the present invention will be described with reference to the accompanying drawings.

A: Flow Rate Control Unit

Figure 1:
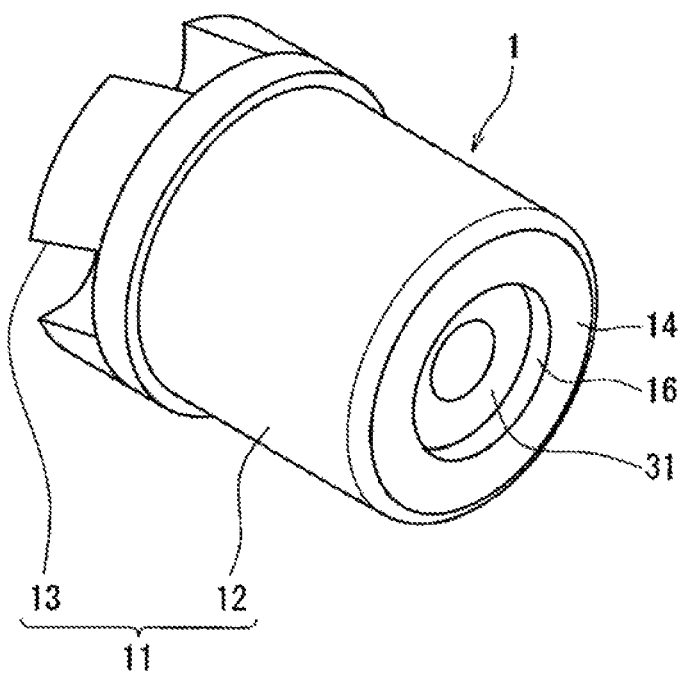
FIG. 1 shows a perspective view of a flow rate control unit according to a preferred embodiment of the present invention.
Figure 2:
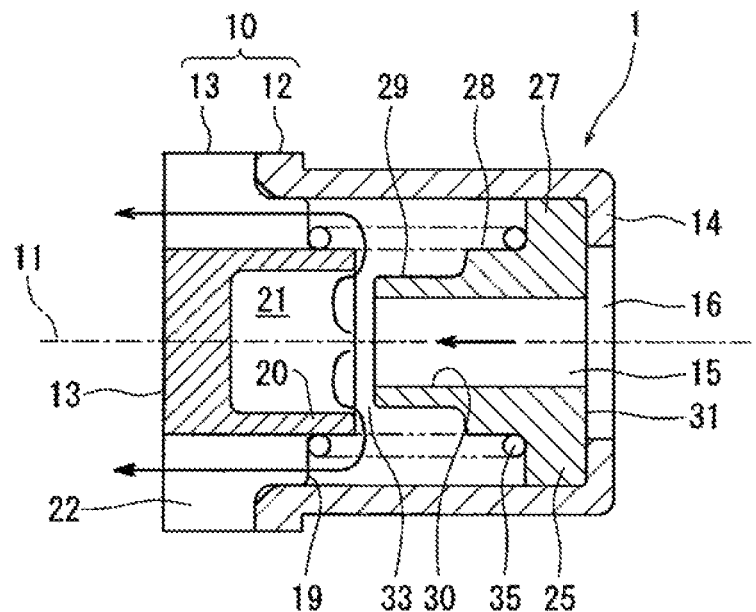
FIG. 2 is a cross-sectional view taken along a central axis of the flow rate control unit shown in FIG. 1, and shows a state in which a valve member is at a most upstream position.
Figure 3:
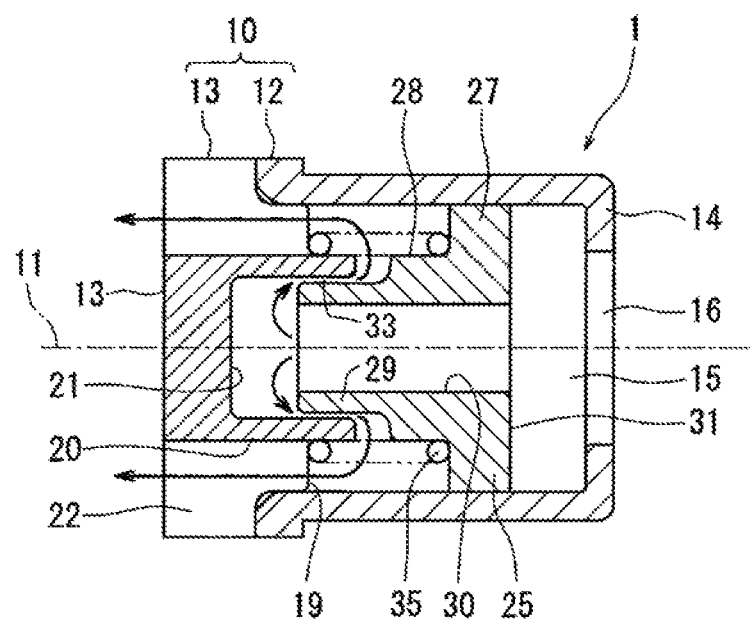
FIG. 3 is a cross-sectional view taken along a central axis of the flow rate control unit shown in FIG. 1, and shows a state in which the valve member is at a position moved from a most upstream position to a downstream side.

FIGS. 1 to 3 show a first preferred embodiment of a flow rate control unit 1 according to the present invention. The flow rate control unit 1 is incorporated in a flow passage (not shown) of liquid flowing from the right side to the left side in FIGS. 2 and 3. Therefore, in the following description, the right side and the left side in FIGS. 2 and 3 are respectively referred to as an "upstream side" and a "downstream side".

Housing

The flow rate control unit 1 includes a housing 10. In the illustrated preferred embodiment, the housing 10 includes two members. These two members include a tubular cylindrical wall (peripheral wall) 12 extending along a central axis 11 indicated by an imaginary line in FIGS. 2 and 3, and a downstream wall 13 coupled to a downstream end of the cylindrical wall 12. An upstream end of the cylindrical wall 12 extends inward toward the central axis 11 to integrally form an upstream wall (restriction) 14. Therefore, the housing 10 is outlined by three wall portions (a cylindrical wall 12, a downstream wall 13, and an upstream wall 14), and a flow passage space (flow passage) 15 for flowing liquid is formed inside the housing 10.

Upstream Wall

In the illustrated preferred embodiment, the upstream wall 14 is integrally formed with the cylindrical wall 12. Instead, the upstream wall 14 may be made of a single member or a plurality of more members, and the upstream wall so constructed may be assembled at the upstream end of the cylindrical wall.

In the illustrated preferred embodiment, the upstream wall 14 is an annular flange having a constant width in the radial direction about the central axis 11 and extending continuously in the peripheral direction about the central axis 11, but it may be made of a plurality of portions spaced apart in the peripheral direction. For example, the plurality of portions may be protrusions protruding inward from the cylindrical wall and spaced apart at regular intervals in the peripheral direction.

As described above, the upstream wall 14 forms a circular or substantially circular upstream opening (inlet opening) 16 about the central axis 11 and inside the upstream wall. This allows the liquid flowing from the upstream side to flow into the flow passage 15 through the upstream opening 16.

Downstream Wall

As shown in FIGS. 4A to 4C, the downstream wall 13 is a substantially circular block having a central axis 17 that coincides with the central axis 11 in a state of being combined with the cylindrical wall 12 (state in FIGS. 1 to 3), and includes a circular base portion 18 on the downstream side, a circular raised portion 19 formed integrally and concentrically with the circular base portion 18 on the upstream side of the circular base portion 18, and a circular tubular portion (hereinafter, referred to as an "outer hollow cylindrical portion", as necessary) 20 formed integrally and concentrically with the circular raised portion 19 on the upstream side of the circular raised portion 19.

An outer diameter of the circular base portion 18 is approximately equal to the downstream end outer diameter of the cylindrical wall 12. The outer diameter of the circular raised portion 19 is approximately equal to the downstream end inner diameter of the cylindrical wall 12. The circular tubular portion 20 is a hollow cylinder and has an outer diameter smaller than that of the circular raised portion 19, forming a cylindrical recess or chamber 21 inside. The cylindrical chamber 21 works as a space for receiving an inner hollow cylindrical portion 29 which will be described below.

The circular base portion 18 and the circular raised portion 19 have a plurality of downstream peripheral openings (outlet openings) 22 formed at portions outside the circular tubular portion 20 to extend through the circular base portion 18 and the circular raised portion 19 in the direction of the central axis 17.

In the preferred embodiment, four downstream peripheral openings 22 are formed at regular angular intervals of 90° in the peripheral direction.

In the preferred embodiment, each of the downstream peripheral openings 22 is in the form of a notch or groove cutout from the outer peripheral surface of the downstream wall 13. In other preferred embodiments, the downstream peripheral opening 22 may be a hole through the downstream wall 13.

In the preferred embodiment, central axes 23 of the downstream peripheral openings 22 are all inclined at a predetermined angle (for example, 17°) with respect to the direction 24 parallel to the central axis 17. In other preferred embodiments, the downstream peripheral opening 22 may extend in parallel to the central axis 17.

The downstream wall 13 so constructed is secured by fitting the circular raised portion 19 into the downstream end opening of the cylindrical wall 12, which causes the plurality of downstream peripheral openings 22 to be fluidly connected to the flow passage 15 of the cylindrical wall 12.

Therefore, the liquid flowing through the flow passage 15 from the upstream side flows out downstream through the downstream peripheral opening 22.

Valve Member

Figure 5A:
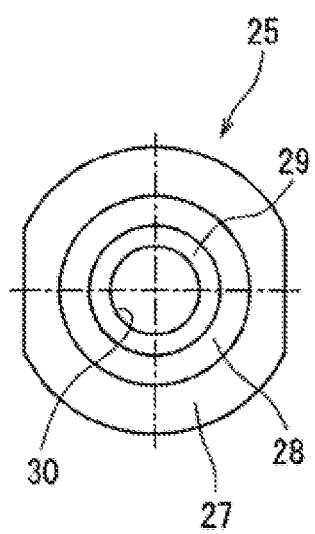
FIG. 5A shows a rear view and FIG. 5B shows a partially cut side view, of the valve member constituting the flow rate control unit shown in FIG. 1.
Figure 5B:
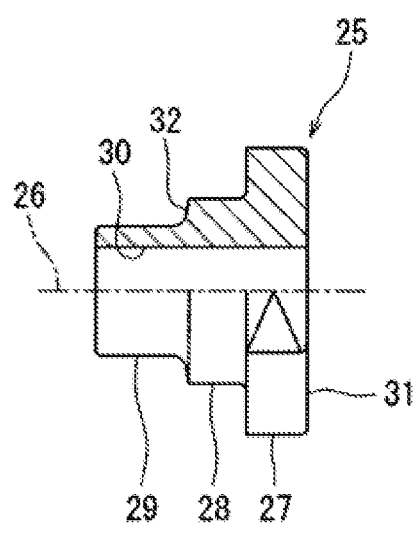

A valve member 25 is fitted in the flow passage 15 within the cylindrical wall 12. As shown in FIGS. 5A and 5B, the valve member 25 is a substantially hollow cylindrical block having a central axis 26 that coincides with the central axis 11 in a state of being incorporated in the cylindrical wall 12 (see FIGS. 2 and 3), and includes an upstream side cylindrical portion 27, a central cylindrical portion 28 formed integrally and concentrically with the upstream side cylindrical portion 27 on the downstream side of the upstream side cylindrical portion 27, and a downstream side cylindrical portion (hereinafter, referred to as an "inner hollow cylindrical portion" as necessary) 29 formed integrally and concentrically with the central cylindrical portion 28 on the downstream side of the central cylindrical portion 28. These three cylindrical portions 27, 28, and 29 are formed with one cylindrical flow passage (hereinafter, referred to as a "first guide passage") 30 running along the central axis 26.

As shown in FIGS. 2 and 3, the inner diameter of the first guide passage 30 is smaller than the inner diameter of the upstream side opening 16 formed in the upstream wall 14. Therefore, in a state where the valve member 25 abuts on the upstream wall 14, a portion facing the upstream side opening 16 in the upstream end surface 31 of the valve member 25 (that is, a portion not facing the upstream wall 14 in the upstream end surface 31 of the valve member 25) receives a force from the liquid flowing into the flow passage 15. In a state where the valve member 25 has moved to the downstream side from the upstream wall 14, the entire upstream end surface 31 of the valve member 25 receives a force from the liquid flowing into the flow passage 15. Therefore, the upstream end surface 31 of the valve member 25 functions as a pressure receiving portion.

The outer diameter of the upstream side cylindrical portion 27 is substantially the same as or slightly smaller than the inner diameter of the cylindrical wall 12. Therefore, the valve member 25 can move along the central axis 11 from the upstream side to the downstream side or from the downstream side to the upstream side in the flow passage 15 as the outer peripheral surface of the upstream side cylindrical portion 27 is guided by the inner peripheral surface of the cylindrical wall 12.

The outer diameter of the inner hollow cylindrical portion 29 is smaller than the inner diameter of the outer hollow cylindrical portion 20 in the downstream wall 13. Therefore, as shown in FIG. 3, the inner hollow cylindrical portion 29 of the valve member 25 telescopically moves in and out of the outer hollow cylindrical portion 20 of the downstream wall 13, which results in that an annular gap is formed between the outer peripheral surface of the inner hollow cylindrical portion 29 and the inner peripheral surface of the outer hollow cylindrical portion 20 in a state where the inner hollow cylindrical portion 29 is inside the outer hollow cylindrical portion 20.

Figure 6A:
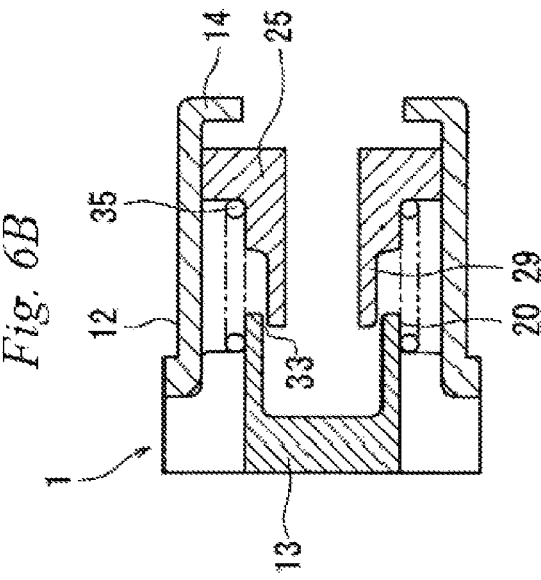
FIGS. 6A to 6D are cross-sectional views showing movement of the valve member in the flow rate control unit shown in FIG. 1.
Figure 6B:
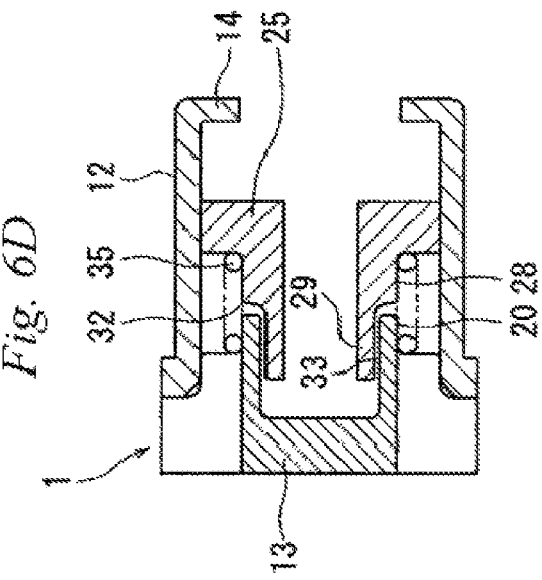
Figure 6C:
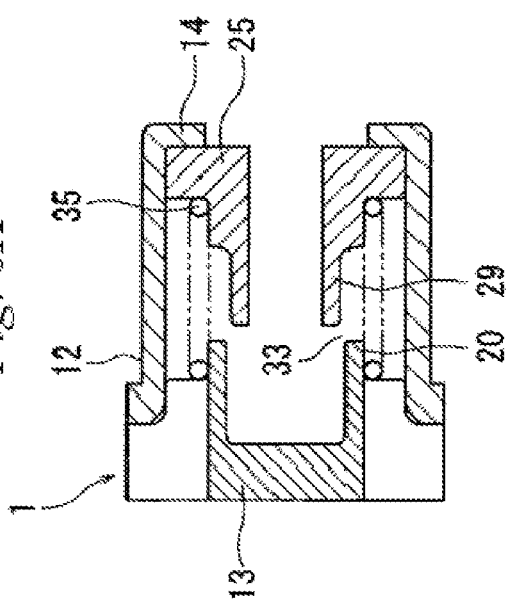
Figure 6D:
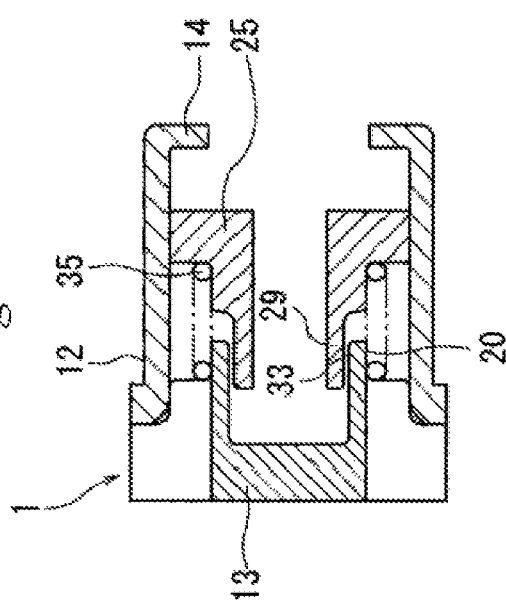

The length of the valve member 25 in the direction of the central axis 11 is determined such that, when the valve member 25 takes the most upstream position abutting on the upstream wall 14 as shown in FIG. 2,
the downstream end of the inner hollow cylindrical portion 29 positions spaced apart from and on the upstream end of the outer hollow cylindrical portion 20 with respect to the direction of the central axis 11;
the downstream end of the inner hollow cylindrical portion 29 positions at substantially the same position as the upstream end of the outer hollow cylindrical portion 20; or
the downstream end of the inner hollow cylindrical portion 29 positions spaced apart from and on the downstream side of the upstream end of the outer hollow cylindrical portion 20, and when the valve member 25 takes the most downstream position inside the flow passage 15 as shown in FIG. 3 (also indicated in FIG. 6D) where an annular step 32 formed at the boundary between the central cylindrical portion 28 and the inner central cylindrical portion (downstream side cylindrical portion) 29 takes a position closest to the upstream end of the outer hollow cylindrical portion 20, the inner central cylindrical portion 29 is inside the outer hollow cylindrical portion 20.

Hereinafter, the flow passage formed between the outer hollow cylindrical portion 20 and the inner hollow cylindrical portion 29 is referred to as a second guide flow passage 33 (see FIGS. 2 and 3).

The size of the second guide flow passage 33 changes with the position of the valve member 25. For example, as shown in FIG. 2, when the inner hollow cylindrical portion 29 stays outside the outer hollow cylindrical portion 20, the second guide flow passage 33 is an annular gap formed between the downstream end of the inner hollow cylindrical portion 29 and the upstream end of the outer hollow cylindrical portion 20. As shown in FIG. 3, when the inner hollow cylindrical portion 29 is inside the outer hollow cylindrical portion 20, the second guide flow passage 33 is a thin cylindrical gap formed between the outer peripheral surface of the inner hollow cylindrical portion 29 and the inner peripheral surface of the outer hollow cylindrical portion 20. The length of the gap (the length in the direction of the central axis 11) varies with an amount of insertion of the inner hollow cylindrical portion 29 inside the outer hollow cylindrical portion 20.

Therefore, the resistance received by the liquid passing through the second guide flow passage 33 changes with the position of the valve member 25, that is, the relative positions in the central axis direction of the inner hollow cylindrical portion 29 and the outer hollow cylindrical portion 20 (i.e., spacing or overlapping distance between the two portions 29 and 20). Therefore, the inner hollow cylindrical portion 29 and the outer hollow cylindrical portion 20 function as variable resistance portions that change the resistance applied to the liquid flowing through the second guide flow passage 33.

Biasing Member

As shown in FIGS. 2 and 3, a biasing member made of an elastic compression spring 35 helically arranged around the valve member 25 is arranged between the circular raised portion 19 of the downstream wall 13 and the upstream side cylindrical portion 27 of the valve member 25. The length or elasticity of the compression spring 35 in the central axis direction is determined such that, when the liquid does not flow in the flow passage 15 (i.e., when the valve member 25 does not receive force directed toward the downstream side by the liquid flowing in the flow passage 15), the compression spring 35 slightly forces the valve member 25 against the upstream wall 14 to hold the valve member 25 in the most upstream position and, when the valve member 25 receives a force directed to the downstream side by the liquid flowing in the flow passage 15, the compression spring 35 is compressed in response to the force and, as a result, the positional relationship between the inner hollow cylindrical portion 29 and the outer hollow cylindrical portion 20 changes to increase the resistance applied to the liquid flowing through the second guide flow passage 33.

Operation

According to the flow rate control unit 1 so constructed, the pressurized liquid flowing toward the flow passage 15 from the upstream side of the flow rate control unit 1 enters the upstream side opening 16 into the first guide passage 30 in the valve member 25. The liquid passed through the first guide passage 30 flows through the second guide passage 33 between the inner hollow cylindrical portion 29 and the outer hollow cylindrical portion 20 and then flows out from the downstream peripheral opening 22 of the downstream wall 13.

The pressure of the liquid acts on the upstream end surface (pressure receiving portion) 31 of the valve member 25 facing the upstream side opening 16. Accordingly, the valve member 25 receives a force in the downstream direction. The force varies depending on the pressure of the flowing liquid. For example, as the water pressure increases, the force acting on the valve member 25 and, as a result, the force applied from the valve member 25 to the compression spring 35 increase, causing the compression of the spring 35 to move the valve member 25 toward the downstream side as shown in FIG. 3. FIGS. 6A to 6D show that the valve member 25 takes different positions responding to the water pressure. For example, the valve member 25 takes the most upstream position shown in FIG. 6A when the water pressure is zero or substantially zero, and the valve member 25 gradually moves toward the most downstream position shown in FIG. 6D with the increase of the water pressure.

The resistance received by the liquid passing through the second guide flow passage 33 increases with the movement of the valve member 25 in the downstream direction and, as a result, the difference (head loss) between the pressure of the liquid flowing into the flow passage 15 and the pressure of the liquid flowing out through the downstream peripheral opening 22 increases, and the flow rate of the liquid flowing out from the downstream peripheral opening 22 decreases.

By contrast, the pressure decrease of the liquid flowing into the flow passage 15 through the upstream side opening 16 decreases the movement of the valve member in the downstream direction and also the resistance that the liquid passing through the second guide passage 33 receives and, as a result, the difference (head loss) between the water pressure of the liquid flowing into the flow passage 15 and the water pressure of the liquid flowing out through the downstream peripheral opening 22 decreases, and the flow rate of the liquid flowing out from the downstream peripheral opening 22 increases.

Therefore, the flow rate control unit 1 sends out the liquid at a constant or substantially constant pressure and at a constant or substantially constant flow rate, irrespective of the water pressure of the liquid flowing into the unit.

B. Water Supply Device

A water supply device with a fine bubble generating function incorporating the above-described flow rate control unit will be described. The water supply device described below is a shower head.

Figure 7:
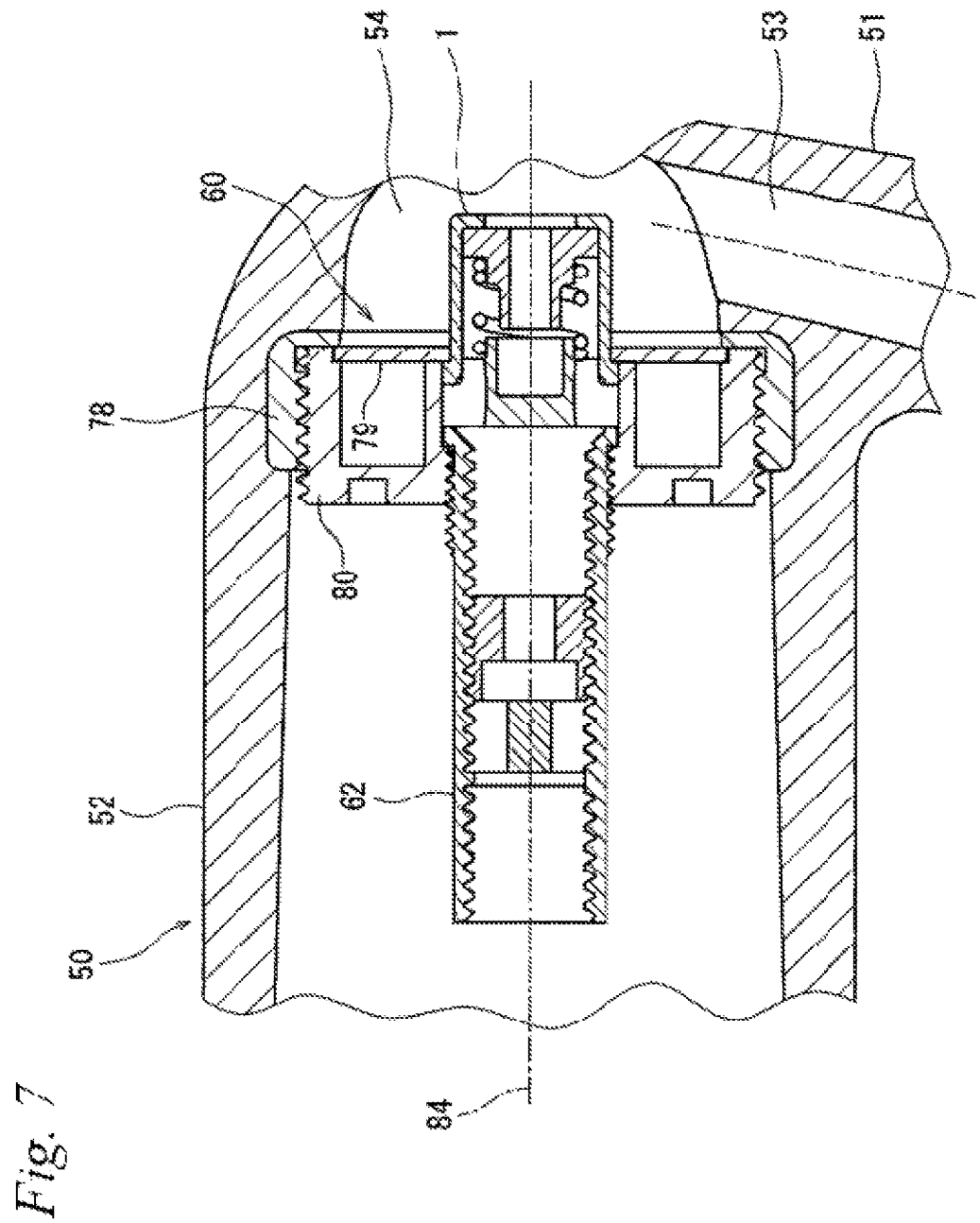
FIG. 7 shows a partial cross-sectional view of a shower head incorporating the flow rate control unit shown in FIG. 1.

FIG. 7 shows a part of a shower head 50 including the flow rate control unit 1.

Head Body

The shower head 50 includes a gripping portion 51 integrally molded by molding plastic and a cylindrical head body 52. The gripping portion 51 has a flow passage 53 defined therein, through which liquid (typically water) flows. The head body 52 is formed with a space 54 leading to the flow passage 53 of the gripping portion 51. A water saving assembly 60 is housed in the space 54.

Water Saving Assembly

The water saving assembly 60 includes the above-described flow rate control unit 1, a fine bubble generating unit 62 which will be described below, and a plurality of fixing components for fixing these two units 1 and 62 to the head body 52.

Fine Bubble Generating Unit

Figure 8:
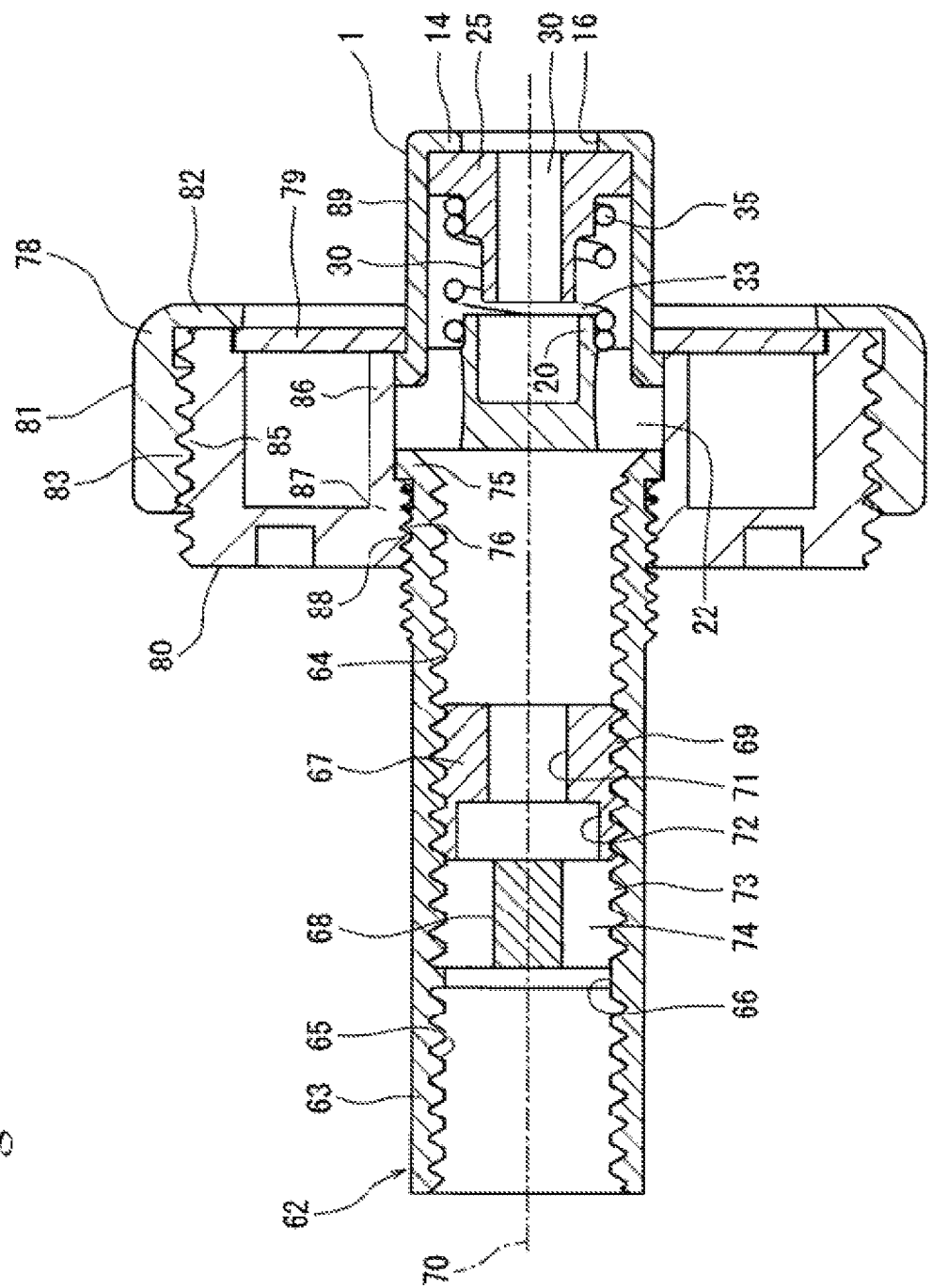
FIG. 8 shows a cross-sectional view of a water saving assembly incorporated in the shower head shown in FIG. 7.

As shown in FIG. 8, the fine bubble generating unit 62 includes a straight, hollow cylindrical tube 63. An upstream side inner thread 64 and a downstream side inner thread 65 are formed from the upstream end and the downstream end, respectively, of the inner surface of the tube 63. A discontinuous region 66 is formed between the downstream end of the upstream side inner thread 64 and the upstream end of the downstream side inner thread 65. In the preferred embodiment, the discontinuous region 66 is a region where no thread is formed. Instead, the discontinuous region may be formed by differentiating the thread directions or the thread pitches of the upstream and downstream side inner threads 64 and 65.

A first agitation member 67 and a second agitation member 68 are inserted within the upstream side inner thread 64 in this order from the upstream side to the downstream side.

An outer peripheral surface of the first agitation member 67 has an outer thread 69 engageable with the upstream side inner thread 64. The first agitation member 67 has a small-diameter cylindrical flow passage 71 on the upstream side and a large-diameter cylindrical flow passage 72 on the downstream side both extending along the central axis 70 of the tube 63.

An peripheral surface of the second agitation member 68 has an outer thread 73 engageable with the upstream side inner thread 64. The second agitation member 68 has a plurality of grooves or flow passages 74 formed on the outer peripheral surface thereof and extending through between the upstream end and the downstream end and arranged at regular angular intervals in the peripheral direction.

The first agitation member 67 and the second agitation member 68 so constructed are threaded from the upstream end of the tube 63 and fixed on the upstream side of the discontinuous region 66.

A radially outwardly protruding annular flange 75 is integrally formed at an upstream of the outer peripheral surface of the tube 63. Also, an outer thread 76 is formed on the outer peripheral surface of the tube 63 at adjacent to the downstream side of the flange 75.

Fixing Components

The plurality of fixing components include a coupling 78, a support plate 79, and a connection joint 80.

Figure 9:
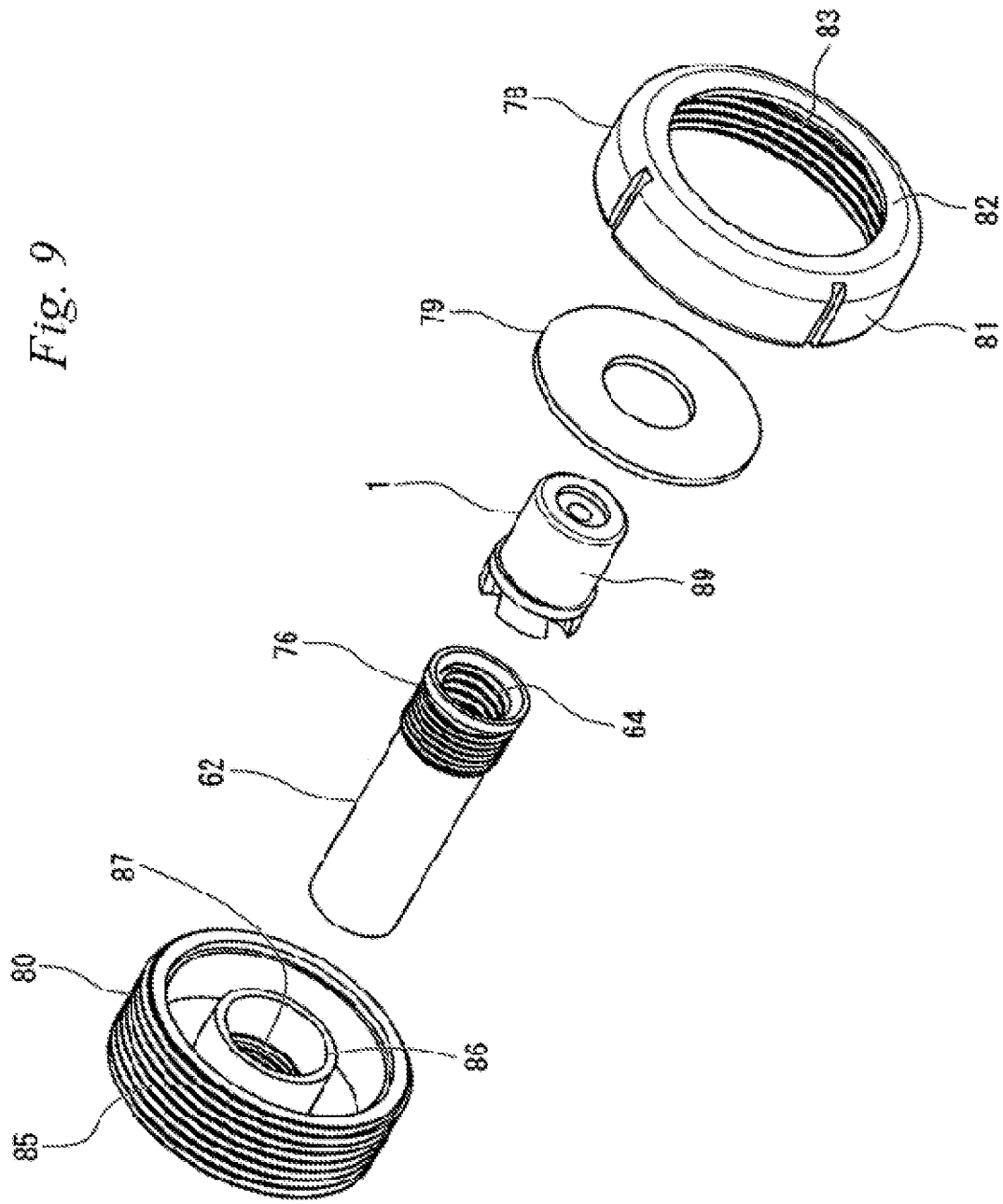
FIG. 9 shows an exploded perspective view of the water saving assembly shown in FIG. 8.

As shown in FIG. 9, the coupling 78, which is made of an annular ring, integrally includes a hollow cylindrical portion 81 and a flange 82 protruding radially inwardly from an upstream end of the cylindrical portion 81. The hollow cylindrical portion 81 has an inner thread 83 formed on an inner surface of the cylindrical portion 81. The coupling 78 so constructed is integrally insert-molded and fixed to the head body 52 with the central axis of the cylindrical portion 81 coincident with the central axis 84 (FIG. 7) of the head body 52.

The support plate 79 is a disk-shaped plate.

The connection joint 80, which is made of an annular ring, has an outer thread 85 formed on the outer peripheral surface and engageable with the inner thread 83 of the coupling 78. The inner peripheral surface of the connection joint 80 has a large-diameter cylindrical portion 86 on the upstream side and a small-diameter cylindrical portion 87 on the downstream side. The inner peripheral surface of the small-diameter cylindrical portion 87 has an inner thread 88 formed on the downstream side of the small diameter portion 87 and engageable with the outer thread 76 of the tube 63.

In assembling those components, for example, the fine bubble generating unit 62 is inserted into the inside of the connection joint 80 from the upstream side, and the outer thread 76 of the tube 63 is engaged with the inner thread 88 of the connection joint 80. Next, the flow rate control unit 1 is fitted into the large-diameter cylindrical portion 86 of the connection joint 80 from the upstream side thereof. Subsequently, the support plate 79 is externally mounted on the cylindrical wall 89 of the flow rate control unit 1. Finally, the assembled block is inserted within the internal space of the head body 52 from its downstream side, and the outer thread 85 of the connection joint 80 is engaged with the inner thread 83 of the coupling 78.

Operation

According to the shower head 50 so constructed, the liquid delivered through the flow passage 53 of the gripping portion 51 is supplied to the space 54 inside the shower head body 52. As shown in FIGS. 2 and 3, the liquid that has entered the space 54 enters the flow passage 15 of the flow rate control unit 1 through the upstream side opening 16 of the flow rate control unit 1, and is ejected from the downstream peripheral opening 22 through the first guide passage 30 and the second guide flow passage 33 as described above. At this time, the valve member 25 moves from the upstream side to the downstream side or from the downstream side to the upstream side in the flow passage 15 according to the water pressure, and the flow rate of the liquid to be ejected is maintained substantially constant.

As shown in FIGS. 7 and 8, the liquid ejected from the flow rate control unit 1 enters the inside of the tube 63 of the fine bubble generating unit 62 and flows there toward the downstream side.

Next, the liquid flowing in the tube 63 passes from the small-diameter cylindrical flow passage 71 on the upstream side of the first agitation member 67 and through the large-diameter cylindrical flow passage 72 on the downstream side of the first agitation member 67. At this time, the velocity of the liquid increases in flowing in the small-diameter cylindrical flow passage 71, increasing the dynamic pressure (kinetic energy) and decreasing the static pressure, which results in that gas dissolved in the liquid grows into bubbles. Subsequently, when the liquid enters the large-diameter cylindrical flow passage 72, the dynamic pressure (kinetic energy) decreases and the static pressure increases, which results in that the grown bubbles are separated into fine bubbles.

The liquid passed through the first agitation member 67 enters the plurality of flow passages 74 of the second agitation member 68. At this time, the liquid that has passed through the large-diameter cylindrical flow passage 72 of the first agitation member 67 deviates radially outwardly into the plurality of flow passages 74. In flowing through the flow passages 74, the liquid is frictionally sheared by the peripheral inner thread 64 and thereby the bubbles contained in the liquid are again broken into finer bubbles.

Thereafter, the liquid flows out of the second agitation member 68 and then enters the region of the downstream side inner thread 65. In this region, the dynamic pressure (kinetic energy) decreases and the static pressure increases and thereby the bubbles are again sheared and broken into finer bubbles. Also, the liquid passing near the downstream side inner thread 65 is again frictionally sheared by the downstream side inner thread 65. As a result, bubbles contained in the liquid are again broken into finer bubbles.

As described above, the liquid passing through the inside of the shower head 50 repeatedly suffers pressure changes to generate a large amount of fine bubbles and the bubbles are repeatedly sheared by the contacts with threads. Accordingly, the liquid ejected from the shower head 50 has a high pressure and contains a large amount of fine bubbles.

Experiment 1

Figure 10A:
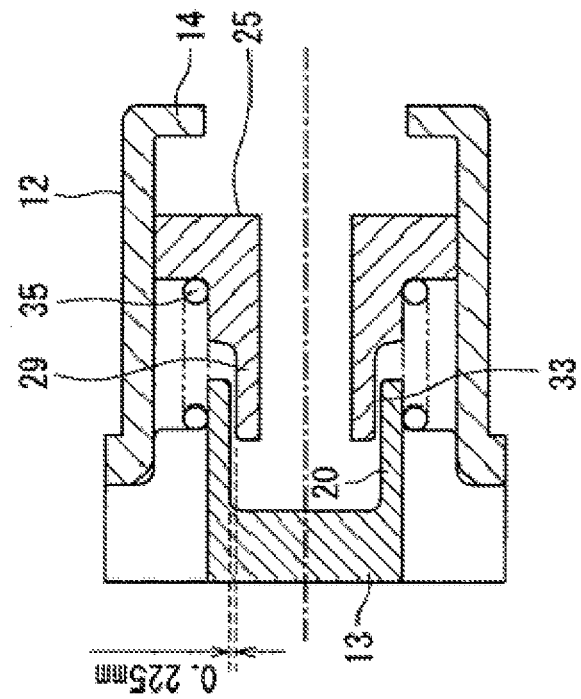
FIGS. 10A and 10B show cross-sectional views showing dimensions of each part of the flow rate control unit used in an experiment.
Figure 10B:
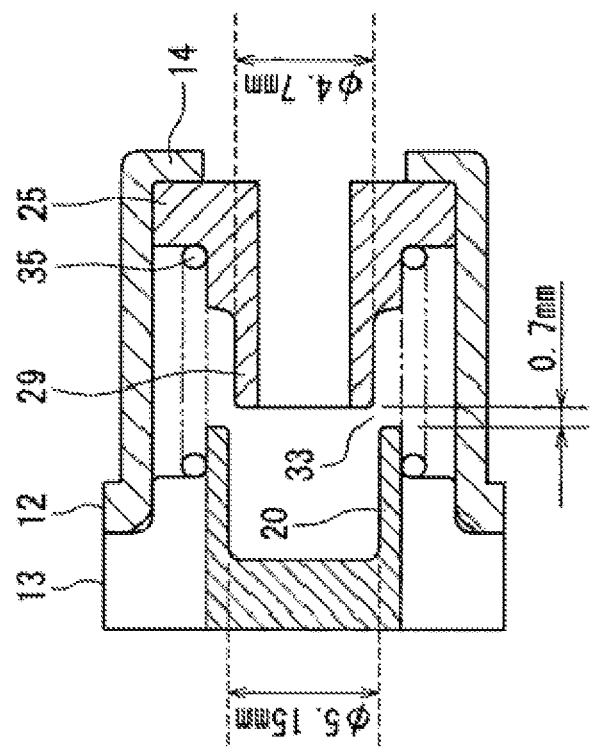

Five shower heads (Nos. 1 to 5) incorporating the flow rate control unit were prepared, and the amount of water to be ejected was measured for each of the shower heads by changing the pressure of the water being supplied. Dimensions of the used flow rate control unit, particularly of parts relating to the flow rate regulation, are shown in FIGS. 10A and 10B. A helical spring having a spring constant of 6.72 N/mm was used for the compression spring working as a biasing member. The results are shown in Table 1.

TABLE 1

| Water pressure | Flow rate (L/min) | | | | |
|---|---|---|---|---|---|
| (MPa) | No. 1 | No. 2 | No. 3 | No. 4 | No. 5 |
| 0.15 | 4.60 | 4.70 | 4.84 | 4.56 | 4.90 |
| 0.25 | 4.70 | 4.77 | 5.02 | 5.06 | 5.08 |
| 0.35 | 4.62 | 4.88 | 4.84 | 5.01 | 4.90 |
| 0.45 | 4.68 | 5.38 | 5.08 | 4.86 | 5.36 |
| 0.50 | 4.67 | 4.80 | 5.06 | 5.19 | 4.70 |
| Average | 4.65 | 4.91 | 4.97 | 4.94 | 4.99 |

As can be seen from Table 1, all of the shower heads holds that the average flow rate was 5 L/min or less, the minimum flow rate was 4.5 L/min or more, and the maximum flow rate was 5.5 L/min, and a substantially stable flow rate was obtained regardless of the water pressure.

Experiment 2

The number and median diameter (D50) of ultrafine fine bubbles contained in the shower water ejected from the shower head incorporating the flow rate control unit were measured by varying the pressure of water being supplied. The water temperature was 40° C. The results are shown in Table 2.

TABLE 2

| Pressure (MPa) | Number of ultrafine bubbles ($\times 10^4$/ml) | Median diameter (D50) (μm) |
|---|---|---|
| 0.2 | 773 | 0.198 |
| 0.3 | 1,671 | 0.168 |
| 0.4 | 2,141 | 0.132 |

Table 2 shows that a required amount of ultrafine bubbles was obtained even under the high water pressure of 0.4 MPa and the low pressure of 0.2 MPa.

Other Embodiments

The flow rate control unit of the first preferred embodiment described above may be modified in various ways.

Second Embodiment

Figure 11A:
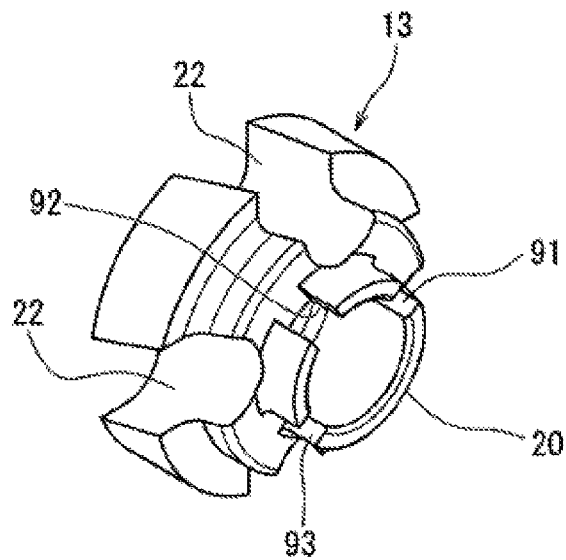
FIG. 11A shows a perspective view and FIG. 11B shows a front view, according to another preferred embodiment of an outer hollow cylindrical portion.
Figure 11B:
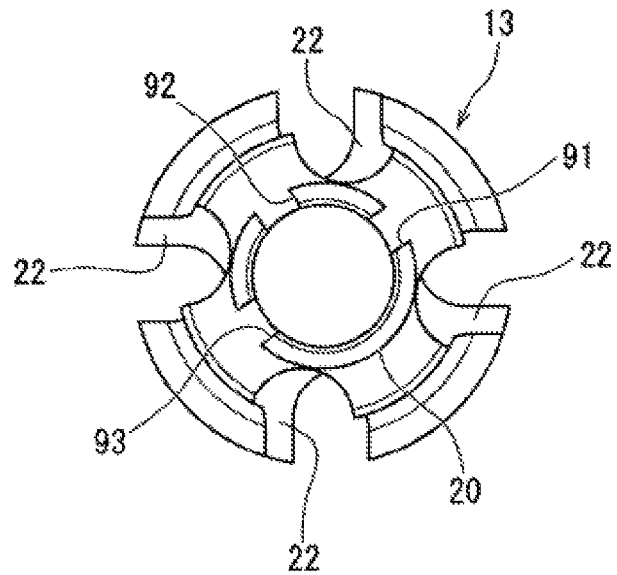

The flow rate may be adjusted by forming one or more grooves or slots extending from the upstream side end portion toward the downstream side of the outer hollow cylindrical portion on the outer hollow cylindrical portion of the flow rate control unit. For example, in another preferred embodiment shown in FIGS. 11A and 11B, the outer hollow cylindrical portion 20 has three slots 91 to 93 extending from the upstream end to the downstream side thereof and spacing at angular intervals of 90° in the peripheral direction. The number, interval in the peripheral direction, width in the peripheral direction, and/or length in the central axis direction of the slots may be determined in response to the conditions, for example, the size and shape, of the water supply device incorporating the flow rate control unit, allowing more flexible flow regulations.

The slots may be provided in the inner hollow cylindrical portion instead of or in addition to the outer hollow cylindrical portion. In this embodiment, the number, interval, width, and/or depth of the slots of the outer hollow cylindrical portion or the inner hollow cylindrical portion or both can be varied in response to the conditions, for example, the size and shape, of the water supply device incorporating the flow rate control unit, allowing more flexible flow regulations.

Third Embodiment

Although in the first embodiment the flow rate control unit is configured to have the inner cylindrical portion and the outer hollow cylindrical portion, respectively, in the valve member and the downstream wall to cause the liquid from the first guide flow passage to be directed radially outward through the second guide flow passage, the flow rate control unit may be configured to have the outer cylindrical portion and the inner cylindrical portion, respectively, in the valve member and the downstream wall to cause the liquid from the first guide to flow radially inward through the second guide flow passage. In this embodiment, a plurality of grooves extending parallel or spirally to the central axis may be formed in the outer peripheral surface of the valve member or the inner peripheral surface of the cylindrical wall facing the outer peripheral surface of the valve member, or a plurality of through holes penetrating the valve member may be formed near the outer peripheral surface of the valve member and are used as the first guide flow passage, and on the other hand, a downstream peripheral opening may be formed inside the inner cylindrical portion in the downstream side wall.

Fourth Embodiment

Although in the flow rate control units of the first and second embodiments the cylindrical gap is formed between both the hollow cylindrical portions by setting that the outer diameter of the inner hollow cylindrical portion is smaller than the inner diameter of the outer hollow cylindrical portion and is used as the second guide flow passage, the outer diameter of the inner hollow cylindrical portion may be the same or substantially the same as the inner diameter of the outer hollow cylindrical portion such that the inner hollow cylindrical portion is capable of move in and out of the interior of the outer hollow cylindrical portion.

In this embodiment, additionally, at least one groove extending along the central axis from the opening end portion of the inner hollow cylindrical portion (i.e., opening end portion adjacent to the outer hollow cylindrical portion) toward the opposite side may be provided on the outer peripheral surface of the inner hollow cylindrical portion, at least one groove extending along the central axis from the opening end portion of the outer hollow cylindrical portion (i.e., the opening end portion adjacent to the inner hollow cylindrical portion) toward the opposite side may be provided on the inner peripheral surface of the outer hollow cylindrical portion, or both of these grooves may be provided.

In this embodiment, the grooves may be used as the second guide flow passage.

The flow rate control unit and the water supply device described above may be used for various purposes and in various fields. For example, they may be incorporated in a water supply system used in an environmental field (industrial wastewater treatment, sludge volume reduction, water purification, and water quality improvement), an agricultural field (plant growth promotion, yield increase, quality improvement, and insect pest extermination), a food field (freshness preservation, oxidation prevention, and suppressing use of chemicals), a cleaning field (cleaning of toilet, and cleaning of clothes and food), a beauty field (face washing, scalp washing, shower head), and the like. Depending on the field of application, the liquid does not need to be water, and it may be other than water (for example, oil, liquid mixture of oil and liquid other than oil).

What is claimed is:

1. A flow rate control unit comprising:
    (a) a housing having
        a hollow cylindrical wall configured to form thereinside a flow passage that guides liquid from an upstream side toward a downstream side,
        an upstream wall disposed on the upstream side of the flow passage,
        a downstream wall disposed on the downstream side of the flow passage,
        an inlet opening formed in the upstream wall, and
        an outlet opening formed in the downstream wall;
    (b) a valve member disposed inside the hollow cylindrical wall and between the upstream wall and the downstream wall,
        the valve member being moveable between a most upstream position at which a movement of the valve member toward the upstream side is restricted by the upstream wall and a most downstream position at which a movement of the valve member toward the downstream side is restricted by the downstream wall,
        the valve member having a pressure receiving portion that faces the inlet opening and receives a force, in a direction toward the downstream side, from the liquid flowing into the flow passage from the inlet opening; and
    (c) an elastic biasing member configured to bias the valve member toward the most upstream position and deform such that the movement of the valve member toward the downstream side increases in response to a force received at the pressure receiving portion from the liquid increases,
    (d) wherein the valve member or the cylindrical wall forms a first guide flow passage that guides the liquid flowing into the flow passage from the inlet opening to the downstream side of the valve member,
    (e) wherein the valve member cooperates with the downstream wall to form, between the valve member and the downstream wall, a second guide flow passage that guides the liquid from the first guide flow passage to the outlet opening, (f) wherein the second guide flow passage cooperates with the valve member and the downstream wall to constitute a variable resistance portion that gives a resistance to the liquid passing through the second guide flow passage, the resistance increasing as the valve member moves from the upstream wall toward the downstream side, (g) wherein the first guide flow passage extends through the valve member along a central axis of the flow passage, (h) wherein the valve member has an inner hollow cylindrical portion extending from the upstream side toward the downstream side along the central axis and having an opening at a downstream side end portion of the valve member, (i) wherein the downstream wall has an outer hollow cylindrical portion extending from the downstream side toward the upstream side along the central axis and having an opening at an upstream side end portion of the cylindrical portion, (j) wherein an outer diameter of the inner hollow cylindrical portion is smaller than an inner diameter of the outer hollow cylindrical portion, (k) the inner hollow cylindrical portion is insertable inside the outer hollow cylindrical portion and, when inserted, leaving a gap extending inside the outer hollow cylindrical portion and forming the second guide cylindrical passage between the inner hollow cylindrical portion and the outer hollow cylindrical portion, and (l) wherein a length of the second guide flow passage increases with the movement of the valve member from the upstream side toward the downstream side, which in turn increases a resistance applied to the liquid passing through the second guide flow passage.

2. The flow rate control unit according to claim 1, wherein the valve member has an outer peripheral surface having a shape corresponding to an inner peripheral surface of the cylindrical wall, and the outer peripheral surface of the valve member is configured to be guided by the inner peripheral surface of the cylindrical wall when the valve member moves.

3. A flow rate control unit comprising:
(a) a housing having
a hollow cylindrical wall configured to form thereinside a flow passage that guides liquid from an upstream side toward a downstream side,
an upstream wall disposed on the upstream side of the flow passage,
a downstream wall disposed on the downstream side of the flow passage,
an inlet opening formed in the upstream wall, and
an outlet opening formed in the downstream wall;
(b) a valve member disposed inside the hollow cylindrical wall and between the upstream wall and the downstream wall,
the valve member being moveable between a most upstream position at which a movement of the valve member toward the upstream side is restricted by the upstream wall and a most downstream position at which a movement of the valve member toward the downstream side is restricted by the downstream wall,
the valve member having a pressure receiving portion that faces the inlet opening and receives a force, in a direction toward the downstream side, from the liquid flowing into the flow passage from the inlet opening; and (c) an elastic biasing member configured to bias the valve member toward the most upstream position and deform such that the movement of the valve member toward the downstream side increases in response to a force received at the pressure receiving portion from the liquid increases, (d) wherein the valve member or the cylindrical wall forms a first guide flow passage that guides the liquid flowing into the flow passage from the inlet opening to the downstream side of the valve member, (e) wherein the valve member cooperates with the downstream wall to form, between the valve member and the downstream wall, a second guide flow passage that guides the liquid from the first guide flow passage to the outlet opening, (f) wherein the second guide flow passage cooperates with the valve member and the downstream wall to constitute a variable resistance portion that gives a resistance to the liquid passing through the second guide flow passage, the resistance increasing as the valve member moves from the upstream wall toward the downstream side, (g) wherein the first guide flow passage extends through the valve member along a central axis of the flow passage, (h) wherein the valve member has an inner hollow cylindrical portion extending from the upstream side toward the downstream side along the central axis and having an opening at a downstream side end portion of the valve member, (i) wherein the downstream wall has an outer hollow cylindrical portion extending from the downstream side toward the upstream side along the central axis and having an opening at an upstream side end portion of the downstream wall, (j) wherein an outer diameter of the inner hollow cylindrical portion is substantially the same as an inner diameter of the outer hollow cylindrical portion, (k) wherein the inner hollow cylindrical portion is insertable inside the outer hollow cylindrical portion, (l) wherein at least one groove that extends along the central axis to form the second guide flow passage is formed on an outer peripheral surface of the inner hollow cylindrical portion or an inner peripheral surface of the outer hollow cylindrical portion or both, and (m) wherein a length of the second guide flow passage increases with the movement of the valve member from the upstream side toward the downstream side, which in turn increases a resistance applied to the liquid passing through the second guide flow passage.

4. The flow rate control unit according to claim 3, wherein the valve member has an outer peripheral surface having a shape corresponding to an inner peripheral surface of the cylindrical wall, and the outer peripheral surface of the valve member is configured to be guided by the inner peripheral surface of the cylindrical wall when the valve member moves.

5. A flow rate control unit comprising:
(a) a housing having
a hollow cylindrical wall configured to form thereinside a flow passage that guides liquid from an upstream side toward a downstream side,
an upstream wall disposed on the upstream side of the flow passage, a downstream wall disposed on the downstream side of the flow passage,
an inlet opening formed in the upstream wall, and
an outlet opening formed in the downstream wall;
(b) a valve member disposed inside the hollow cylindrical wall and between the upstream wall and the downstream wall,
the valve member being moveable between a most upstream position at which a movement of the valve member toward the upstream side is restricted by the upstream wall and a most downstream position at which a movement of the valve member toward the downstream side is restricted by the downstream wall,
the valve member having a pressure receiving portion that faces the inlet opening and receives a force, in a direction toward the downstream side, from the liquid flowing into the flow passage from the inlet opening; and
(c) an elastic biasing member configured to bias the valve member toward the most upstream position and deform such that the movement of the valve member toward the downstream side increases in response to a force received at the pressure receiving portion from the liquid increases,
(d) wherein the valve member or the cylindrical wall forms a first guide flow passage that guides the liquid flowing into the flow passage from the inlet opening to the downstream side of the valve member,
(e) wherein the valve member cooperates with the downstream wall to form, between the valve member and the downstream wall, a second guide flow passage that guides the liquid from the first guide flow passage to the outlet opening,
(f) wherein the second guide flow passage cooperates with the valve member and the downstream wall to constitute a variable resistance portion that gives a resistance to the liquid passing through the second guide flow passage, the resistance increasing as the valve member moves from the upstream wall toward the downstream side,
(g) wherein the first guide flow passage extends through the valve member in parallel to a central axis of the flow passage,
(h) wherein the valve member has an outer hollow cylindrical portion extending from the upstream side toward the downstream side along the central axis and having an opening at a downstream side end portion of the valve member,
(i) wherein the downstream wall has an inner hollow cylindrical portion extending from the downstream side toward the upstream side along the central axis and having an opening at an upstream side end portion of the downstream wall,
(j) wherein an inner diameter of the outer hollow cylindrical portion is larger than an outer diameter of the inner hollow cylindrical portion,
(k) the inner hollow cylindrical portion is capable of being inserted inside the outer hollow cylindrical portion and, when inserted, leaving a gap extending outside the inner hollow cylindrical portion and forming the second guide cylindrical portion between the inner hollow cylindrical portion and the outer hollow cylindrical portion, and
(l) wherein a length of the second guide flow passage increases with a movement of the valve member from the upstream side toward the downstream side, which in turn increases a resistance applied to the liquid passing through the second guide flow passage.

6. A flow rate control unit comprising:
(a) a housing having
a hollow cylindrical wall configured to form thereinside a flow passage that guides liquid from an upstream side toward a downstream side,
an upstream wall disposed on the upstream side of the flow passage,
a downstream wall disposed on the downstream side of the flow passage,
an inlet opening formed in the upstream wall, and
an outlet opening formed in the downstream wall;
(b) a valve member disposed inside the hollow cylindrical wall and between the upstream wall and the downstream wall,
the valve member being moveable between a most upstream position at which a movement of the valve member toward the upstream side is restricted by the upstream wall and a most downstream position at which a movement of the valve member toward the downstream side is restricted by the downstream wall,
the valve member having a pressure receiving portion that faces the inlet opening and receives a force, in a direction toward the downstream side, from the liquid flowing into the flow passage from the inlet opening; and
(c) an elastic biasing member configured to bias the valve member toward the most upstream position and deform such that the movement of the valve member toward the downstream side increases in response to a force received at the pressure receiving portion from the liquid increases,
(d) wherein the valve member or the cylindrical wall forms a first guide flow passage that guides the liquid flowing into the flow passage from the inlet opening to the downstream side of the valve member,
(e) wherein the valve member cooperates with the downstream wall to form, between the valve member and the downstream wall, a second guide flow passage that guides the liquid from the first guide flow passage to the outlet opening,
(f) wherein the second guide flow passage cooperates with the valve member and the downstream wall to constitute a variable resistance portion that gives a resistance to the liquid passing through the second guide flow passage, the resistance increasing as the valve member moves from the upstream wall toward the downstream side,
(g) wherein the first guide flow passage extends through the valve member in parallel to a central axis of the flow passage,
(h) wherein the valve member has an outer hollow cylindrical portion extending from the upstream side toward the downstream side along the central axis and having an opening at a downstream side end portion of the valve member,
(i) wherein the downstream wall has an inner hollow cylindrical portion extending from the downstream side toward the upstream side along the central axis and having an opening at an upstream side end portion of the downstream wall,
(j) wherein an inner diameter of the outer hollow cylindrical portion is substantially the same as an outer diameter of the inner hollow cylindrical portion, (k) wherein at least one groove that extends along the central axis to form the second guide flow passage is formed on an outer peripheral surface of the inner hollow cylindrical portion or an inner peripheral surface of the outer hollow or both, and (m) wherein a length of the second guide flow passage increases with a movement of the valve member from the upstream side toward the downstream side, which in turn increases a resistance applied to the liquid passing through the second guide flow passage.

7. A flow rate control unit, comprising:
(a) a housing defining a flow passage, the housing having
  a hollow cylindrical peripheral wall extending along a central axis running in liquid flow direction,
  an upstream wall disposed on an upstream side of the peripheral wall with respect to the liquid flow direction and integrally formed with the peripheral wall,
  a downstream wall disposed on a downstream side of the peripheral wall with respect to the liquid flow direction and integrally formed with the peripheral wall, and
  a flow passage space surrounded by the peripheral wall, the upstream wall and the downstream wall to form the flow passage in which liquid flows from the upstream side toward the downstream side,
(b) a valve member disposed inside the flow passage space to move along the central axis from the upstream side toward the downstream side and vice versa as the valve member is guided by the peripheral wall, and
(c) a biasing member configured to bias the valve member toward the upstream wall,
(d) wherein the upstream wall has
  a restriction that protrudes radially inward from the peripheral wall toward the central axis to restrict a movement of the biased valve member from the downstream side toward the upstream side, and
  an upstream side opening communicating the flow passage space with an upstream side external space on the upstream side of the upstream wall;
(e) wherein the upstream wall and the valve member are constructed such that the liquid flowing from the upstream external space into the flow passage space hits the valve member to force the valve member from the upstream side toward the downstream side,
(f) wherein the biasing member permits the valve member to move such that a movement of the valve member in the downstream direction away from the restriction increases with an increase of a force that the valve member receives from the liquid,
(g) wherein the valve member has an upstream passage formed therein to guide the fluid in the flow passage space in the downstream direction,
(h) wherein the downstream wall has a downstream opening (23) that guides the liquid in the flow passage space toward a downstream external space on the downstream side of the downstream wall,
(i) wherein a downstream passage is formed between the valve member and the downstream wall to communicate the upstream passage with the downstream opening,
(j) wherein the downstream passage constitutes a variable resistance portion that gives a resistance to the liquid flowing in the downstream passage, wherein a length of the downstream passage increases with an increase of a movement of the valve member in the downstream direction, which in turn increases the variable resistance against the fluid flowing in the downstream passage,
(k) wherein the variable resistance portion comprises
  an upstream hollow cylindrical portion formed in the valve member and extending along the central axis toward the downstream wall,
  a downstream hollow cylindrical portion formed in the downstream wall and extending along the central axis toward the valve member,
wherein the upstream hollow cylindrical portion and the downstream hollow cylindrical portion are configured such that the upstream hollow cylindrical portion moves telescopically with respect to the downstream hollow cylindrical portion in response to the movement of the valve member along the central axis and thereby increases the resistance that the liquid passing through the downstream passage receives with an increase of the movement of the valve member in the downstream direction.

8. The flow rate control unit of claim 7, wherein
in order for the upstream hollow cylindrical portion to move in and out of the downstream hollow cylindrical portion, an outer diameter of the upstream hollow cylindrical portion is smaller than an inner diameter of the downstream hollow cylindrical portion and thereby a gap is formed between an outer peripheral surface of the upstream hollow cylindrical portion and an inner peripheral surface of the downstream hollow cylindrical portion, the gap defining the variable resistance portion.

9. The flow rate control unit of claim 7, wherein
in order for the downstream hollow cylindrical portion to move in and out of the upstream hollow cylindrical portion, an inner diameter of the upstream hollow cylindrical portion is larger than an outer diameter of the downstream hollow cylindrical portion and thereby a gap is formed between an inner peripheral surface of the upstream hollow cylindrical portion and an outer peripheral surface of the downstream hollow cylindrical portion, the gap defining the variable resistance portion.

10. The flow rate control unit of claim 7, wherein
an inner diameter of the upstream hollow cylindrical portion is the same as or substantially the same as an outer diameter of the downstream hollow cylindrical portion, and
at least one groove formed in at least one of the inner peripheral surface of the upstream hollow cylindrical portion and the outer peripheral of the downstream hollow cylindrical portion.

11. A water supply apparatus comprising the flow rate control unit in claim 7.

12. The water supply apparatus of claim 11, comprising a fine bubble generating unit incorporated on a downstream side of the flow rate control unit with respect to a liquid flowing direction in the apparatus.

* * * * *